July 13, 1954  J. GERENTES  2,683,375
DRILLING MACHINE DRIVE
Filed May 26, 1950  3 Sheets-Sheet 1
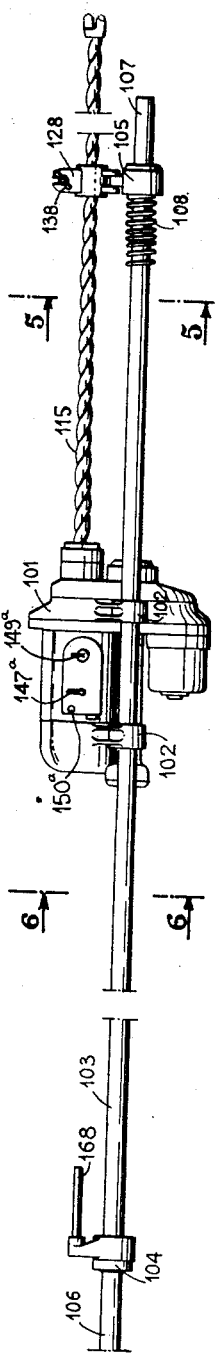
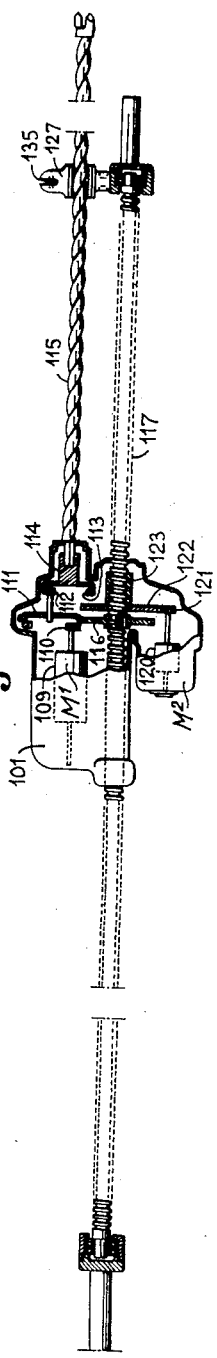
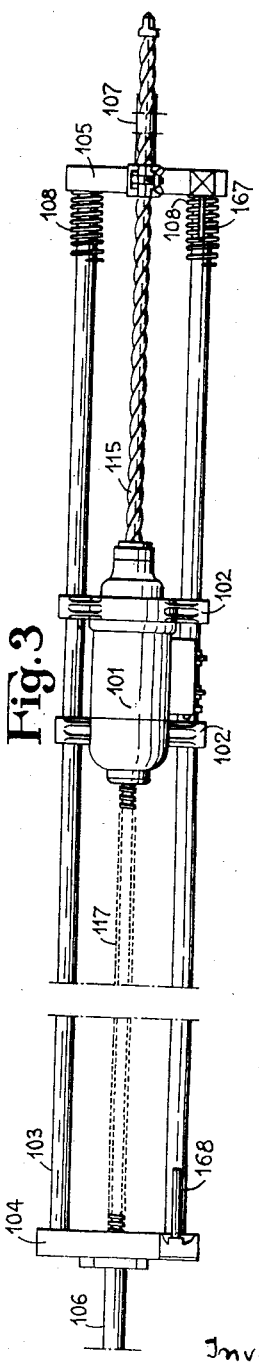
Inventor
JEAN GÉRENTÈS
by: J Delatter-Aguy
Attorney July 13, 1954   J. GERENTES   2,683,375
DRILLING MACHINE DRIVE
Filed May 26, 1950   3 Sheets-Sheet 2
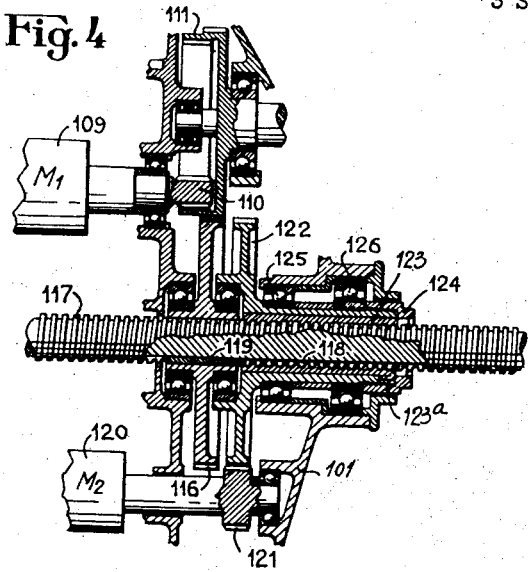
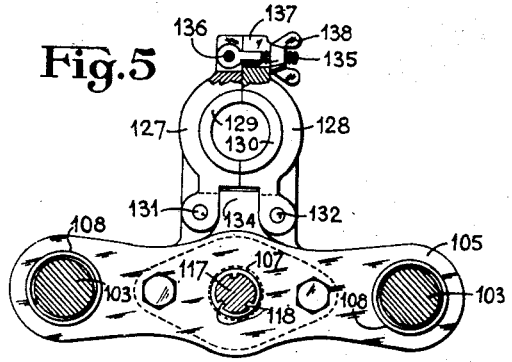
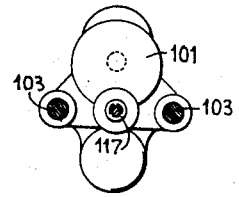
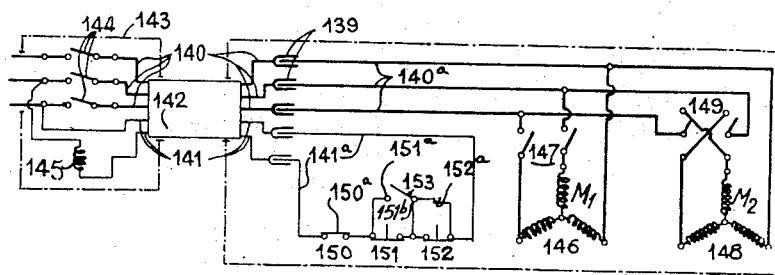
Inventor
JEAN GÉRENTÈS
by: [signature]
Attorney July 13, 1954

J. GERENTES 2,683,375

DRILLING MACHINE DRIVE

Filed May 26, 1950

Inventor
JEAN GÉRENTÈS
by: J Delattre-Seguy
Attorney

Patented July 13, 1954

2,683,375

UNITED STATES PATENT OFFICE 2,683,375

DRILLING MACHINE DRIVE

Jean Gerentes, Saint-Etienne, France, assignor to Constructions Electro-Mecaniques de Saint-Etienne Ancienne Usine "Wageor," Saint-Etienne (Soire), France, a French body corporate Application May 26, 1950, Serial No. 164,570

Claims priority, application France May 27, 1949

3 Claims. (Cl. 74—22)

In his U. S. A. patent application No. 21, 649 filed on April 17, 1948, now Patent No. 2,547,079 issued April 3, 1951 the applicant has described a drilling machine with variable feed in which the drill, or similar tool, is rotated by a principal electric motor with normal rotor slipping, while the longitudinal backwards and forwards motion is provided by the differential actions of this principal motor and of a reversible auxiliary motor with a high rotor slip, said auxiliary motor being controlled by a reverse and stop switch.

In the embodiment described in the above-mentioned patent application the machine is fixed and the drill is secured on the end of a screw having a helicoidal motion composed of the rotary motion due to the principal motor and of a longitudinal motion varying automatically with the hardness of the material to be drilled and due to the differential actions of the two motors.

The present invention has for its object an improved drilling machine which makes it possible to drill a hole of great length in a single operation while the length of said machine is shorter for a given depth of hole than that of the machine according to the aforesaid embodiment.

The invention has more particularly for its object a machine which comprises in combination: an elongated stationary frame; a carriage moving along this frame; a boring tool journalling in this carriage from which it projects and whose axis of rotation is parallel to the direction of the motion of said carriage; a lead screwed shaft which rotates in said frame and whose axis is also parallel to the direction of motion of said carriage; a nut screwed onto said screwed shaft and journalled in said carriage; a principal electric motor mounted on this carriage and providing the rotary motion for this tool and screwed shaft; an auxiliary reversible electric motor with a high rotor slip (i. e. a motor the rotor speed of which varies considerably with the opposing torque), this motor driving said nut at a speed higher than the speed of rotation of the lead screw shaft and a reversing switch in the electric circuit of this motor so that this nut, the carriage and the tool are driven longitudinally forwards or backwards according to the position of said reversing switch and at a speed which is a function of the relative speeds of rotation of said lead screw shaft and said nut.

In the accompanying drawings which are given solely by way of examples:

Fig. 1 shows an outside view of the machine mounted on its base;

Fig. 2 shows an elevation view of the machine mounted on its frame with a partial longitudinal section and diagrammatic representation of the various driving mechanisms;

Fig. 3 shows a top view of the same machine with its frame;

Fig. 4 shows a detailed cross-sectional view of the variable feed mechanism;

Fig. 5 is a vertical cross section along the line 5—5 of Fig. 1 but to a larger scale showing the drill guide;

Fig. 6 is a rear view of the drilling machine mounted on its frame, this view corresponding to a cross-section along line 6—6 of Fig. 1;

Fig. 7 is a diagram of the electric circuit;

Figure 8:
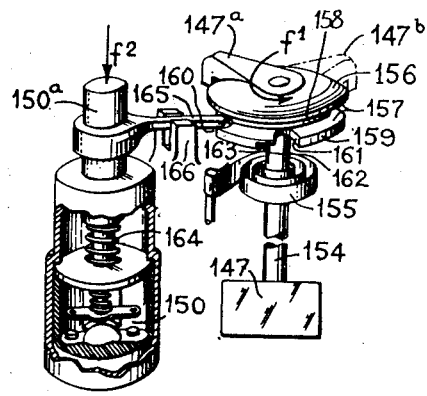
Fig. 8 is a perspective view, partly in section, of the principal motor switch and of a hand switch.

According to the embodiment shown, a carriage 101 slides by means of four bearings 102 on two rods 103 rigidly assembled with two braces 104 and 105.

The assembly 103, 104, 105 forms a frame which is provided at its ends with extensions 106 and 107 by means of which it can be mounted on some support device (not shown on drawing) appropriate for the work to be done and which serves to direct the entire assembly, by conventional means, in the direction for boring several holes. In addition a shock-absorbing spring 108 surrounds each rod 103 near the front brace 105.

On carriage 101 is secured a principal motor $M_1$ the rotor of which is shown at 109 (Fig. 2). This motor drives, by means of a gear consisting of toothed wheels 110, 111, 112 and 113, a shaft 114 into which fits the drill 115.

This same motor $M_1$ also drives, through a gear consisting of wheels 111 and 116, a screwed shaft 117. This shaft is mounted in the frame in such a way that it can rotate at both ends in the braces 104 and 105 but without possibility of moving longitudinally. It is provided with longitudinal grooves 118 (Fig. 4) into which fit keys 119 carried by the wheel 116.

On carriage 101 is also mounted an auxiliary motor $M_2$ with a high rotor slip (i. e. with large variation $dV$ of the speed for a given variation $dC$ of the torque, the term $dV$ representing speed variations and the term $dC$ representing variations of the torque; the ratio of the variation $dV$ with respect to the variation $dC$ representing mathematically the derivative of the relation between the speed V and the torque C; thus, the term $dV$ is the variation of V for an infinitely small variation $dC$ of the torque C). This motor $M_2$ which is reversible can, for instance, be an asynchronous squirrel cage motor with a particularly high resistance.

Only the rotor 120 (Figs. 2 and 4) of this motor $M_2$ is shown. This rotor 120 drives, by means of a gear consisting of elements 121 and 122, a removable nut 123 keyed on the hub of the wheel 122, for instance on the tip of this hub by one or several radial projections 123a provided on this nut and which fit into grooves in the side of said hub. The nut 123 is locked longitudinally by a nut 124 (Fig. 4) screwed on said hub and in contact with said projections 123a.

Said hub of the wheel 122 is journalled by means of two bearings 125 and 126 in the frame of the carriage 101.

In order to facilitate the starting of the drilling operation the machine is provided with a guide located in front, on brace 105. This guide, in which the drill 115 is centered, can easily be disengaged once the hole is begun. It consists (Fig. 5) for instance, of two half rings 127 and 128 in which are inserted and secured half bushings 129 and 130 which act as friction elements. These half rings swing respectively about pins 131 and 132. They are pressed on one hand one against the other and on the other hand against a stationary stop 134 which keeps the shaft in a fixed position, by a bolt 135 hinged at 136 to one of the half rings. This bolt fits into a notch 137 in the other half ring and is provided with a nut 138.

When the machine is set in motion these half rings are opened down towards the brace 105, then after the drill has been inserted in the machine they are clamped together as shown in Fig. 5.

The power supply and its control for the two motors $M_1$ and $M_2$ can, for example, be provided in a manner similar to that described in the aforesaid U. S. A. application No. 21,649, now Patent No. 2,547,079 issued April 3, 1951 or again in the manner shown in Fig. 7.

According to this embodiment, a five-pin plug 139 connects five conductors (three main conductors 140 and two pilots 141) of a cable 142 to conductors 140a and 141a respectively of the machine.

The other end of the five wire cable is connected in a box 143 to some standard contactor switch 144 the operating coils 145 of which can be put in or out of circuit by control switches mounted on the machine and connected to leads 141a as hereafter described.

The windings 146 of the main motor $M_1$ are connected to wires 140a through a double pole switch 147 actuated by a lever 147a (Fig. 1). The windings 148 of the auxiliary motor $M_2$ are connected to the same wires 140a through a double-pole reverse switch 149 which is actuated by a lever 149a (Fig. 1).

The coil 145 of contactor 144 is controlled through the combination of three switches 150, 151 and 152 in series between the two wires 141a and through auxiliary reverse switch 153 which may short-circuit one or the other of the switches 151 and 152 according as its moving element is in contact with the contact 151a or the contact 152a.

Switch 150 is a mechanical starting switch. It is operated by a push-button 150a (Figs. 1, 7, 8) coupled with the switch 147 so that the latter never controls the starting or stopping of the main motor $M_1$ which can only be performed by contactor 144. To this end, as shown in Fig. 8, the push-button 150a and the lever 147a of the switch 147 are interlocked in such a way that this push-button 150a can only be pressed when the lever 147a is at rest or is slightly ahead of the closed position of the switch in the direction of closing of this switch.

The lever 147a actuates the moving part of the switch 147 by means of a rod 154. A spiral or other spring 155 tends to rotate the shaft 154, the lever 147a and the moving part of the switch 147 in the direction of the arrow $f^1$, corresponding to the return of the switch to the off position with the switch open and the main motor $M_1$ not in operation. On the shaft 154 is keyed a disc 156 the cylindrical surface of which has a groove 157 with flanges 158 and 159 on either side. The flange 159 is provided with two notches 160 and 161. Between these notches 160, 161, starting at notch 160, the flange 159 carries, along a short length on its outer surface, a recess 162 which ends at a shoulder 163.

The push-button 150a of the starting switch 150 is brought to the off position (switch open) by a spring 164. This button carries a pin 165 guided by a fixed fork 166.

The relative position of switches 150 and 147 is such that when they are both at rest the end of pin 165 is in the groove 157 of the disc 156 and faces the notch 160. Furthermore the angular distance between the two notches 160 and 161 is slightly greater than the angle through which lever 147 must be rotated to bring the switch from the open to the closed position (position 147b of lever 147a).

Besides, the axial travel of push-button 150a is sufficiently small so that at the end of its downward movement the end of pin 165 is:

(a) On the one hand, at such a level that it is still partially in the notch 160 if it faces this notch;

(b) On the other hand, at such a level that it can enter the recess 162 when it is in notch 161.

Under these conditions it is clear that:

At rest, the push-button 150a can be operated but the switch 147 is then locked by the pin 165 which is and remains (because of condition $a$ above) in the notch 160 even if the button 150a is pushed;

If the lever 147a is first turned as far as 147b thus closing the switch 147, the pin 165 remains in the groove 157 and the switch 150 cannot be closed;

To close this switch, the lever 147a must be further rotated beyond the normal closed position 147b in the direction opposite to arrow $f^1$, so that as to bring the notch 161 opposite the pin 165; the button 150a can then be pressed, providing the lever 147a is temporarily kept in its extreme position, then as soon as pin 165 has passed the narrowest part of the flange 159 (on the side of the recess 162) the lever 147a can be released and the spring 155 will bring it back to 147b. This ensures mutual interlocking:

On the one hand, of the switch 150 in the closed position, the pin 165 bearing against the flange 159 in the recess 162; and On the other hand, of the switch 147 in the closed position because the spring 155 is prevented from bringing the switch back to the open position since the shoulder 163 rests (from the above-mentioned condition b) against the pin 165 which is itself held by the guiding fork 166.

In order to bring the two switches back to rest, the lever 147ᵃ must be brought a little ahead of the position 147ᵃ in the direction opposite to the arrow $f^1$ so that the notch 161 faces the pin 165. The spring 164 returns this pin into line with the groove 157 while the switch 150 opens. Finally the lever of switch 147 should be released, and it is then brought to rest, as well as the switch, by the spring 155.

The switch 151 is an "end of forward run" switch. It is located on the moving part of the machine and is actuated at the end of the forward run of the carriage 101 by a stop 167 (Fig. 3) located on the front brace 105.

Similarly, the switch 152 is an "end of backward run" switch; it is located on the moving part of the machine and is operated at the end of the backward run of the carriage 101 by a stop 168 located on the rear cross-piece 104 (Figs. 1 and 3).

As to the auxiliary reversing switch 153, it is interlocked with the double-pole reversing switch 149 of the auxiliary motor M₂ so that both are automatically and simultaneously operated and that at the end of a run in a given direction the switch 153 short-circuits the switch 151 or 152 which has just been opened, and this as soon as the reverse switch 149 is put in the position corresponding to the run in the opposite direction.

The effective form of the interlocking reversing switches 149 and 153 is not difficult to achieve, it can be done in a well known way by using a contact drum-controller.

Figure 9:
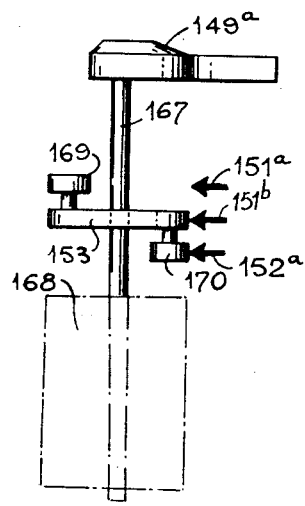
Fig. 9 is a diagram of the auxiliary motor reversing switch and of an auxiliary switch connected with "end of run" switches.

Fig. 9 shows diagrammatically such a device. The operating lever 149ᵃ is integral with a shaft 167 onto which are keyed two discs or drums 168 and 153. On drum 168 are the usual (not represented on diagram) contacts of the reverse-switch 149. On the disc 153 are two contacts 169 and 170 which rub respectively against the fixed contacts 151ᵃ and 152ᵃ while the disc 153 is in permanent contact with a fixed contact 151ᵇ.

This contact 151ᵇ is connected (Fig. 7) with the contacts which are in series of the switches 151 and 152 while contact 151ᵃ or 152ᵃ is connected with the other contact of switch 151 or switch 152 respectively.

The machine operates as follows:

Said machine being at rest, the carriage 101 is supposed to be at some intermediate point of its travel so that the end of run switches 151 and 152 are closed. On the contrary, the following switches are open: the main motor M₁ switch 147; the reversing-switch 149 of the auxiliary motor M₂; the starting-switch 150; the switch 153.

First, the switch 147 is closed by turning the lever 147ᵃ in direction opposite to that of the arrow $f^1$ (Fig. 8) until the notch 161 faces pin 165. Then the button 150ᵃ of switch 150 is pressed in order to close said switch. The tip of the pin 165 comes below the higher side of the recess 162 of the disc 156. The lever 147ᵃ is then released, the spring 155 brings it back to the position 147ᵇ; the pin 165 is then in the recess 162 and bears against the shoulder 163 thus keeping the two switches 147 and 150 in the closed position.

The circuit of the coil 145 of the contactor 144 is then closed since the three switches 150, 151 and 152 (which are in series) are closed. The contactor 144 closes and the main motor M₁ starts as its windings 146 are energized.

Now the lever 149ᵃ is rotated in the direction which closes the double-pole switch 149 of the auxiliary motor M₂ so that said motor M₂ rotates in the same direction as the principal motor M₁; under these conditions, the rear switch 152 is short-circuited by the switch 153 which is automatically brought into the position shown in Fig. 7 by the operation of the lever 149ᵃ because of the locking arrangement shown in Fig. 9.

The rotor 109 of the main motor M₁, drives the tool holder wheel 113 and thus the drill 115, it also provides the rotary motion, but the rotary motion only, of the screw 117.

The rotor 120 of the auxiliary motor M₂ provides the rotary motion, but the rotary motion only, of the nut 123.

The relative speeds of this nut 123 and of the screw 117 causes a forward longitudinal displacement of the nut and so of the carriage 101 and the drill-bit 115. Indeed: let $V_1$ be the speed of rotation of the screw 117 which is due to the main motor M₁, and $V_2$ be the speed of the nut which is imparted to it by the auxiliary motor M₂; the speed of the feed motion is $(V_2-V_1) \times p$, $p$ being the pitch of the screw. The speed of revolution of the drill 115 is $kV_1$, $k$ being a factor which depends on the ratio of the gear train connecting the drill and the screw to the rotor 109.

As regards the distribution of the energy supplied by the main motor M₁ and the auxiliary motor M₂, it can be assumed, with a sufficient degree of approximation, that the principal motor M₁, provides the drilling energy (torque $C_1$) and that the auxiliary motor M₂ provides the energy for the feed (torque $C_2$).

The slipping of the rotor of the feed motor being much greater than that of the rotor of the principal motor, it results:

$$\frac{dV_2}{dC_2} > \frac{dV_1}{dC_1}$$

and $$V_2 > V_1$$

In the foregoing formulas the terms $dV_2$, $dV_1$, $dC_2$, and $dC_1$, have the same mathematical meaning as explained heretofore in connection with the terms $dV$ and $dC$, except that here the term $dV_2$ represents the variation of speed which corresponds to the variation $dC_2$ of the torque supplied by the auxiliary motor M₂, and that $dV_1$ and $dC_1$ are corresponding terms applicable to the principal motor M₁. The first of the two formulas just reproduced merely means that for an equal variation of the torques, in which $dC_1$ equals $dC_2$, the variation of speed is greater for the motor M₂ than it is for the motor M₁. Since the opposing torques are approximately proportional to the hardness R of the material, it may be written:

$$\frac{dV_2}{dR} > \frac{dV_1}{dR}$$

Consequently the difference $(V_2-V_1)$ decreases when R increases.

The speed of feed of the drill therefore decreases and as a result there is a limitation of the absorbed power. It is even possible for a certain torque given by the auxiliary motor M₂ to get equal speeds. The feed will then be nil, the pressure on the screw will be limited by the torque $C_2$ developed by the auxiliary motor just as the absorbed power will be limited by the main motor $M_1$. This condition will be reached for theoretically infinite material hardness.

For the hardness of each material to be drilled there is a point of stable operation at speeds $V_1$ and $V_2$ corresponding to the powers $P_1$ and $P_2$ of each of the motors depending on the conditions of their construction and particularly on the ratio $$\frac{dV}{dC}$$

of each motor.

When the drill has finished its work of drilling, the carriage 101 is near the cross-piece 105 and presses against the shock-absorbing springs 106.

The switch 151 is then opened by the push-button 167. As reversing-switch 153 then short-circuits the end of backward run switch 152, the switch 151, which is not short-circuited, opens the circuit of the control coil 145; the contactor 143 opens and the machine, being no longer supplied with power, stops.

The knob 149a must then be rotated in the opposite direction, this operates the reverse-switch 149 of the auxiliary motor $M_2$ and reverses the position of the switch 153 which short-circuits the open end of the forward run switch 151.

Power is again supplied, the auxiliary motor $M_2$ revolves in the opposite direction and the carriage 101 rapidly runs backward while the switch 151 is simultaneously closed by its spring.

At the end of its backward run, the machine reaches the brace 104 and stop 168 opens the end of backward run switch 152 thus stopping the machine again.

To recommence the operation, the reverse-switch 149 must first be set to the forward running position, this short-circuits the switch 152 with the reverse switch 153 and so on.

The machine according to the invention offers important advantages compared to those described in the above-mentioned patent application: by using a very long drilling tool a very long hole can be drilled in one operation without risk of buckling of this tool because of the front guide; this saves a considerable amount of time; the rigidity of the machine is increased.

Furthermore, the machine takes up less space because the distance from the rear of this machine to the working face is approximately equal to the length of the hole to be drilled whereas in the form described in the aforementioned patent application the machine, in its starting position, is at a distance from the working face already equal to the depth to be drilled and it is necessary to have behind this machine the length of screw required for the distance which the drill-bit has to travel.

Naturally, the invention is in no wise restricted to the embodiment shown and described which was only chosen as an example.

Obviously the various controls can be carried out either by the operation of the switches and reversing switches described and which are in the total supply circuits, or else with ordinary and reverse switches in small current circuits operating contactors or relays.

Having now described my invention what I claim as new and desire to secure by Letters Patent is:

1. A gear drive comprising a stationary frame, a screwed shaft carried by said frame, a carriage movable along said frame, a rotary tool journalled in said carriage, said tool and said shaft having parallel axes, a nut screwed on said shaft and carried by said carriage, said screwed shaft and said nut being respectively rotatably mounted in said frame and in said carriage, a main electric motor and an auxiliary reversible electric motor, both said motors being carried by said carriage, supply circuits for said motors, a first mechanical driving means between the rotor of said main motor and said tool and shaft and adapted to drive said tool and shaft simultaneously, a second mechanical driving means between said nut and the rotor of said auxiliary motor and adapted to drive said nut at a speed higher than the speed of rotation of said screwed shaft, said auxiliary motor having a high rotor slip, and a reversing switch inserted in the supply circuit of said auxiliary motor.

2. A gear drive comprising a stationary frame, a screwed shaft carried by said frame, a carriage movable along said frame, a rotary tool journalled in said carriage, said tool and said shaft having parallel axes, a nut screwed on said shaft and carried by said carriage, said screwed shaft and said nut being respectively rotatably mounted in said frame and in said carriage, a main electric motor and an auxiliary reversible electric motor, both said motors being carried by said carriage, supply circuits for said motors; a first set of two partially common trains of gears between on the one hand the rotor of said main motor and on the other hand said tool and said shaft and adapted to drive them simultaneously, a second train of gears between the rotor of said auxiliary motor and said nut and adapted to drive said nut at a speed higher than that of said shaft, said auxiliary motor having a high rotor slip, and a reversing switch inserted in the supply circuit of said auxiliary motor.

3. An electric gear drive comprising an elongated stationary frame provided with at least one rectilinear slideway, a screwed shaft journalled in said frame, a carriage movable along said frame, a rotative tool journalled in said carriage, the axes of said shaft and tool being parallel to said slideway, a nut screwed on said shaft and journalled in said carriage, a main electric motor carried by said carriage, a first mechanical driving means between on the one hand the rotor of said main motor and on the other hand said tool and shaft and adapted to drive them simultaneously, an auxiliary reversible electric motor carried by said carriage and having a high rotor slip, other driving means between the rotor of said auxiliary motor and said nut to drive said nut at a speed higher than that of said screwed shaft, supply circuits for said motors, and a reversing switch inserted in the supply circuit of said auxiliary motor.

References Cited in the file of this patent

UNITED STATES PATENTS

| Number | Name | Date |
|---|---|---|
| 2,023,841 | Kingsbury | Dec. 10, 1935 |
| 2,240,795 | Morgan | May 6, 1941 |
| 2,244,127 | Smith | June 3, 1941 |
| 2,365,681 | Gartin | Dec. 26, 1944 |
| 2,432,313 | Heumann | Dec. 9, 1947 |
| 2,434,120 | Paget | Jan. 6, 1948 |
| 2,520,014 | Rehnberg | Aug. 22, 1950 |
| 2,547,079 | Gerentes | Apr. 3, 1951 |